United States Patent
Pyles et al.

(10) Patent No.: US 8,758,860 B1
(45) Date of Patent: Jun. 24, 2014

(54) PROCESS FOR INCORPORATING AN ION-CONDUCTING POLYMER INTO A POLYMERIC ARTICLE TO ACHIEVE ANTI-STATIC BEHAVIOR

(71) Applicant: Bayer MaterialScience LLC, Pittsburgh, PA (US)

(72) Inventors: Robert A. Pyles, Bethel Park, PA (US); Ronald C. Hedden, Lubbock, TX (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 13/670,641

(22) Filed: Nov. 7, 2012

(51) Int. Cl.
- B05D 5/12 (2006.01)
- B05D 1/02 (2006.01)
- B05D 1/18 (2006.01)
- B05D 1/26 (2006.01)
- B05D 1/30 (2006.01)
- B05D 7/02 (2006.01)

(52) U.S. Cl.
CPC .. B05D 1/02 (2013.01); B05D 1/18 (2013.01); B05D 1/26 (2013.01); B05D 1/30 (2013.01); B05D 5/12 (2013.01); B05D 7/02 (2013.01); B05D 2201/02 (2013.01)
USPC ..... 427/384; 427/385.5; 427/393.5; 427/421.1; 427/427.4; 427/427.6; 427/427.7; 427/430.1

(58) Field of Classification Search
None
See application file for complete search history.

(56) References Cited

U.S. PATENT DOCUMENTS

| | | | |
|---|---|---|---|
| 3,118,784 A * | 1/1964 | Webers | 430/527 |
| 3,544,318 A * | 12/1970 | Hoover et al. | 164/138 |
| 4,613,629 A | 9/1986 | Duchane et al. | |
| 4,806,571 A | 2/1989 | Knobel et al. | |
| 5,536,573 A * | 7/1996 | Rubner et al. | 428/378 |
| 5,571,472 A | 11/1996 | Shiraiwa | |
| 5,756,007 A | 5/1998 | Franey | |
| 5,904,980 A | 5/1999 | Rivas | |
| 5,916,486 A | 6/1999 | Angelopoulos et al. | |
| 5,997,773 A | 12/1999 | Angelopoulos et al. | |
| 6,015,509 A | 1/2000 | Angelopoulos et al. | |
| 6,344,412 B1 | 2/2002 | Ichikawa et al. | |
| 6,459,043 B1 | 10/2002 | Dodsworth | |
| 6,534,422 B1 | 3/2003 | Ichikawa et al. | |
| 6,586,041 B1 | 7/2003 | Ibar | |
| 6,687,097 B1 | 2/2004 | Anderson et al. | |
| 6,733,543 B2 | 5/2004 | Pyles et al. | |
| 6,746,626 B2 | 6/2004 | Hayward et al. | |
| 6,749,646 B2 | 6/2004 | Pyles et al. | |
| 6,841,646 B2 | 1/2005 | Yang et al. | |
| 6,929,666 B2 | 8/2005 | Pyles et al. | |
| 6,949,127 B2 | 9/2005 | Pyles et al. | |
| 6,994,735 B2 | 2/2006 | Pyles et al. | |
| 7,041,374 B1 | 5/2006 | Nelson et al. | |
| 7,094,263 B2 | 8/2006 | Pyles et al. | |
| 7,175,675 B2 | 2/2007 | Pyles et al. | |
| 7,236,396 B2 | 6/2007 | Houston et al. | |
| 7,476,339 B2 | 1/2009 | Czubarow et al. | |
| 7,527,042 B2 | 5/2009 | Crary | |
| 7,897,248 B2 | 3/2011 | Barrera et al. | |
| 2004/0126521 A1 | 7/2004 | Extrand | |
| 2005/0194572 A1 | 9/2005 | Suh et al. | |
| 2006/0047052 A1 | 3/2006 | Barrera et al. | |
| 2008/0237527 A1 | 10/2008 | Vasquez et al. | |
| 2009/0236132 A1 | 9/2009 | Hong et al. | |
| 2009/0281227 A1 | 11/2009 | Stern et al. | |
| 2009/0297830 A1 | 12/2009 | Pyles et al. | |
| 2011/0206856 A1 * | 8/2011 | Li et al. | 427/458 |

FOREIGN PATENT DOCUMENTS

WO 2009/053470 A1 4/2009

OTHER PUBLICATIONS

J.R. Chetia et al; Role of poly(2-dimethylaminoethylmethacerylate) salt as solid state ionics; Materials Science and Engineering B107 (2004) pp. 134-138.

* cited by examiner

*Primary Examiner* — Erma Cameron
(74) *Attorney, Agent, or Firm* — John E. Mrozinski, Jr.

(57) ABSTRACT

A process for endowing a polymeric article with a surface layer of an ion-conducting polymer to yield electrical surface resistivity sufficiently low for electrostatic discharge applications is provided. The polymeric article contains one or more immobilized, polymeric components having amine functional groups. The presence of the ion-conducting polymer in the surface layer lowers the surface electrical resistivity into the range suitable for electrostatic discharge applications, between about $1\times10^5$ and about $1\times10^{12}\Omega/\square$. Plastic electrostatic dissipation materials produced by the inventive process may find use in the optical, electronics, automotive, entertainment, sporting goods, and medical sectors.

10 Claims, No Drawings

PROCESS FOR INCORPORATING AN ION-CONDUCTING POLYMER INTO A POLYMERIC ARTICLE TO ACHIEVE ANTI-STATIC BEHAVIOR

FIELD OF THE INVENTION

The present invention relates, in general to polymers and more specifically, to a process for incorporating a surface layer of an ion-conducting polymer into a polymeric matrix to lower the surface resistivity of the material sufficiently to achieve electrostatic dissipation (anti-static behavior).

BACKGROUND OF THE INVENTION

Due to their processability and useful mechanical properties, thermoplastic polymers have found widespread commercial success in consumer goods, military applications, packaging materials, construction, automobiles, and electronics. However, the vast majority of plastics are electrical insulators, which can present problems with static (triboelectric) charge build-up. Electric charge that builds up, triboelectrically or otherwise, on the surface of an insulating plastic may not easily move across the surface of the article to recombine. Applications where static build-up on plastics can be problematic include aircraft, electronics, and military fabrics/devices. Polymers with electrostatic dissipation properties are used in a wide variety of applications, notably for the prevention of explosions due to charge build up in engines and turbines (e.g., U.S. Published Patent Application No. 2008/0237527 and U.S. Pat. No. 7,527,042) and for the protection of electronics (e.g., U.S. Pat. Nos. 5,916,486, 5,997,773, and 6,015,509, and U.S. Pat. Nos. 6,687,097; 6,344,412; 6,534,422; and 6,459,043).

Electronics can be damaged by static discharge, and combustible or energetic materials can be ignited or detonated, respectively. In consumer applications, plastic electrostatic dissipation materials can be useful in flooring (e.g. tiles or carpet) and automobile seat covers, which can otherwise build up a static charge due to friction against shoes or clothing. If electrical insulators are used, these materials can deliver unwanted "shocks" to the consumer, especially under dry atmospheric conditions. Although conducting polymers that make excellent electrostatic dissipation materials are now commercially available, their cost per kg is prohibitively higher than commodity plastics, their processability in common plastics processing equipment is poor, and their mechanical properties are not well-suited to many applications. Therefore, traditional commodity plastics are usually blended with anti-static agents or conducting fillers to achieve electrostatic dissipation properties.

Materials hereinafter referred to as having "electrostatic dissipation characteristics" have surface resistivity in the range of $1\times10^5$ to $1\times10^{12}\Omega/\square$ (or volume resistivity in the range of $1\times10^4$ to $1\times10^{11}$ $\Omega$-cm). Many unmodified plastic resins have surface resistivity in the range of $1\times10^{14}$ to $1\times10^{15}\Omega/\square$, meaning they are electrical insulators. To lower the surface resistivity into the electrostatic dissipation range, a variety of processing strategies have been described.

U.S. Published Patent Application No. 2009/0186254 provides an acid-cured resole with no additional additives that possesses low enough resistivity for electrostatic dissipation applications. The synthesis of a poly(urea-urethane) based on poly(dimethylsiloxane), which exhibits sufficient conductivity at high humidity for electrostatic dissipation applications, is disclosed in U.S. Pat. No. 6,841,646.

Inclusion of moieties capable of conduction within the polymer backbone can also be a successful strategy for electrostatic dissipation materials. U.S. Pat. No. 6,586,041 describes a method for achieving electrostatic dissipation in a transparent polymer material, made from conductive polymer, crosslinkable polymer, and crosslinking agent, for use as a thin film for packaging materials. U.S. Pat. No. 7,041,374 details the use of metallocene moieties within a polymer backbone to confer electrostatic dissipation properties.

In another class of electrostatic dissipation polymers, a chemical additive can be either applied to the surface or incorporated beneath the surface of the article. It is common to introduce anti-static agents during processing, which are often amphiphilic surfactant molecules. The anti-static agent typically has an ionic "head" group and a long, non-polar "tail" group. Due to poor thermodynamics of mixing between the ionic head group and the plastic, the anti-static agent migrates to the surface after processing, forming a highly polar layer at the surface. Due to adsorption of atmospheric moisture onto the surface, the surface resistivity is significantly lowered.

The anti-static agent may be partially lost due to wear or friction on the surface during normal use of the plastic article, but the anti-static agent is self-replenishing to some extent because additional anti-static agent is able to diffuse to the surface over time. While traditional anti-static agents may be useful for common consumer articles, for demanding applications such as outdoor use, the anti-static agents can be lost due to weathering and/or mechanical abrasion. Therefore, approaches involving an immobilized anti-static agent are preferable. For example, U.S. Pat. No. 5,571,472 provides for achieving electrostatic dissipation properties in a shaped resin without damaging physical properties or causing discoloration, via addition of a nitrogen-containing compound during molding, followed with corona discharge treatment to the surface of the shaped article.

Fillers, such as metal particles or carbon fibers, can also be added to a polymer article in order to achieve sufficient conductivity for electrostatic dissipation. Carbon black has been demonstrated for this purpose, as have carbon nanotubes and metal nanocomposites. U.S. Published Patent Application No. 2009/0236132 discusses electrostatic dissipation materials comprised of a dispersion of non-insulating particles, such as gold or carbon black, and an inherently dissipative polymer within a thermosetting resin. U.S. Published Patent Application No. 2009/0281227 discloses a polymer composition consisting of a poly(aryl ether ketone), a poly(biphenyl ether sulfone), and a fibrous carbon nanofiller that possess electrostatic dissipation properties.

U.S. Pat. No. 7,236,396 and U.S. Published Patent Application No. 2004/0126521 describe a high temperature, high strength polymer which uses a metal oxide to achieve electrostatic dissipation for read/write heads in magnetic media. Additionally, these references describe the ability of the material to be dyed via a pigment while maintaining their conductive properties.

U.S. Pat. No. 7,476,339 details the use of non-carbonaceous fillers, such as metal oxide particles, within thermoplastic polymers, for electrostatic dissipation properties. U.S. Published Patent Application No. 2005/0194572 discusses the polymerization of a thermoplastic in the presence of a lithium salt, resulting in electrostatic dissipation capability.

Graphite-filled polymer composites for electrostatic dissipation applications are described in U.S. Pat. No. 6,746,626. US Published Patent Application No. 20060047052 and U.S. Pat. No. 7,897,248 disclose a method for orienting nanotubes within a polymer matrix, leading to an electrostatic dissipation-capable material. A degradable polymer can be used, along with metal flakes, fibers or powders, to achieve electrostatic dissipation properties in a moldable article, as described in U.S. Pat. No. 5,904,980.

Ion-conducting polymers potentially represent another means of lowering the resistivity of a polymeric article. Of particular relevance to the present disclosure are polyamine hydrohalides, a type of ion-conducting polymer. Electrical properties of poly(2-dimethylaminoethylmethacerylate) and its hydrochloride salt, an ion-conducting polymer, have been recently reported (Chema J R, Maullick M, Dutta A, Dass N N. *Materials Science and Engineering B-Solid State Materials for Advanced Technology* 2004; 107(2):134-138.). The electrical conductivity of the ion-conducting polymer was found to be in the range of $10^{-2}$ to $10^{-4}$ S cm$^{-1}$. Incorporation of an ion-conducting polymer into a polymeric matrix is therefore another approach to lowering the electrical resistivity of the material.

Also relevant to the present disclosure is the infusion processing of plastic materials. The optical, mechanical, and electrical properties of various plastics may be enhanced by infusion of compounds, functional additives, or monomers from solution. Infusion of coloring agents and functional additives into polymeric matrices and to articles comprising such matrices has been disclosed in U.S. Pat. Nos. 6,749,646; 6,929,666; 7,094,263; 6,733,543: 6,949,127; 6,994,735; and 7,175,675.

SUMMARY OF THE INVENTION

Accordingly, the present invention provides a process of incorporating an ion-conducting polymer into the surface layer of a polymeric article. The ion-conducting polymers of interest are polyamine hydrohalides. Initially, the polymeric article is understood to contain both a host polymer and a polyamine component, which may be present as a co-monomer, an immiscible blend component, or an interpenetrating network or semi-interpenetrating network. The process includes bringing at least a part of the surface of the article in contact with a solvent mixture containing:

(a) water,
(b) a carrier conforming to $$R_1\text{-}[\text{—O—}(CH_2)_n]_m OR_2$$

where $R_1$ and $R_2$ independently denote a radical selected from the group consisting of linear and branched $C_{1-18}$ alkyl, benzyl, benzoyl, phenyl and H, n is 2 or 3, and m is 1-35, (c) an acid $H^+X^-$, where $X^-$ represents a halide anion ($F^-$, $Cl^-$, $Br^-$, or $I^-$)

(d) an optional surface leveling agent, such as diethylene glycol for a time and at temperature sufficient to infuse at least some of the solvents and the acid $H^+X^-$ into said article to obtain an article having a treated surface layer containing a polyamine hydrohalide, a type of ion-conducting polymer.

The presence of the ion-conducting polymer lowers the surface resistivity into the range of between $1\times10^5$ and $1\times10^{12} \Omega/\square$. Plastic electrostatic dissipation materials produced by the inventive process may find use in the optical, electronics, automotive, entertainment, sporting goods, and medical sectors.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

The present invention provides a process involving contacting at least a part of a surface of a polymeric article with a solvent mixture for a time and at a temperature sufficient to infuse at least a portion of the solvent mixture into the article, the solvent mixture containing (a) water, (b) a carrier conforming to $R_1\text{-}[\text{O—}(CH_2)_n]_m OR_2$ wherein $R_1$ and $R_2$ independently denote a radical selected from the group consisting of linear and branched $C_{1-18}$ alkyl, benzyl, benzoyl, phenyl and H, wherein n is 2 or 3, and m is 1-35, and (c) an acid $H^+X^-$, wherein $X^-$ represents a halide anion selected from the group consisting of $F^-$, $Cl^-$, $Br^-$, or $I^-$, optionally, (d) a surface leveling agent, wherein the polymeric article comprises a host polymer and an immobilized mass fraction of an amine functional species, wherein the resulting article has a treated surface layer containing a polyamine hydrohalide and a surface resistivity between about $1\times10^5 \Omega/\square$ and about $1\times10^{12} \Omega/\square$.

The present invention further provides a process for producing an electrostatic discharge material by incorporating a surface layer of an ion-conducting polymer into a polymeric matrix to lower the surface resistivity of the material sufficiently to achieve electrostatically dissipation (anti-static behavior). Processing is accomplished via infusion of a strong acid such as hydrogen chloride (HCl) into the surface of a polymeric article that contains immobilized amine functional groups, by immersion of the article in a ternary mixture of solvents containing the acid. The amine groups may be present either as a co-monomer in the matrix, or as an interpenetrating network or semi-interpenetrating network within the topmost 10 to 500 µm of the surface. The processed article is found to have surface resistivity between $1\times10^5$ and $1\times10^{12} \Omega/\square$, sufficient for electrostatic dissipation applications.

The term "article" as used hereinbelow is understood to refer to an article of manufacture, or a semi-finished article in the form pellets, sheet or rod, that are made of polymeric resin or a resinous composition. The term "surface layer" as used in the context of the present invention refers to an infused layer extending up to 500 µm beneath the original surface of the host polymer article.

The polymeric materials suitable in the inventive process may be thermoplastic or thermosetting polymers or compositions containing such polymers, hereinafter referred to as "host polymers", which contain an amine-functional co-monomer, or are blended with one of various amine-functional polymeric components. Among the suitable host polymer materials are systems containing at least one of (co) polyesters, aliphatic polycarbonate, polyester-polycarbonate copolymers, styrenic copolymers such as styrene-acrylonitrile and acrylonitrile-butadiene-styrene, acrylic polymers such as polymethylmethacrylate and butylacrylate/styrene-acrylonitrile resins, polyamide, polyurethanes and blends of one or more of these resins. Particularly preferably, the inventive process is applicable to thermoplastic polyurethanes.

The amine functional monomer may be incorporated into the host polymer as a co-monomer, to produce copolymers of random, alternating, or blocky microstructure. Alternatively, a polyamine may be blended with the substrate polymer during processing to form an immiscible or partly miscible blend. Alternatively, a polyamine may be introduced as an interpenetrating network or semi-interpenetrating network, by swelling of the host polymer in an amine-functional monomer and initiator followed by photopolymerization. The amine functionality may be evenly distributed throughout the article, or may be present as a surface layer embedded within the article. Of importance to the success of the process is the possession by the monomer of a pendant moiety that is able to react with the acid $H^+X^-$ in the system. Particularly suitable are primary, secondary, and tertiary pendant alkylamine groups, which are immobilized by covalent bonding to one or more polymeric components within the matrix. Specific examples of suitable polyamines are poly(2-diethylaminoethyl methacrylate) or poly(2-dimethylaminoethylmethacrylate), their copolymers with each other or with other amine-functional methacrylates or amine-functional acrylates, and copolymers of 2-diethylaminoethylmethacrylate or 2-dimethylaminoethylmethacrylate with other monomers such as methyl methacrylate or with the monomer of the host polymer.

According to the present invention, the host polymeric article is treated by applying the solvent mixture and acid $H^+X^-$ to at least a portion of its surface for a time and at temperature sufficient to facilitate at least some infusion of the solvents and acid into the article to obtain a treated surface layer, or by immersing the host polymeric article in the acid solution for said time. For treating articles made of thermoplastic polyurethane, the temperature of the solvent mixture is about 20° C. to 80° C., most preferably in the range of 25° C. to 65° C., and the application time is typically less than one hour, most preferably in the range of 0.1 to 20 minutes. The surface of the article is subsequently rinsed with water and dried by treatment in an oven or by passing air over its surface, or by mechanical means.

In one embodiment of the present invention, an article, preferably of polyurethane composition and containing a functional polyamine component, is immersed in the acid solution. The solvent mixture at a temperature less than the boiling temperature of the monomer, less than the melting temperature of the host polymer, and preferably 25 to 65° C. is applied to the article to be treated. The suitable temperature depends on the composition of the article to be treated and may be determined by routine or combinatorial testing. In accordance with this embodiment of the invention, the immersed article is withdrawn after only a few minutes to provide a treated article. The length of time the article remains immersed in the bath and the process conditions depend upon the desired degree and depth of infusion of $H^+X^-$ into the surface layer. Higher temperatures will increase the rate of infusion and depth of penetration. However, care must be taken not to adversely affect the surface properties of transparent articles used in optical applications or to exceed the heat distortion temperature and thus thermally deform the article.

The application of the solvent mixture to the surface of the article may be by immersing, spraying, or flow-coating to obtain an article containing the acid solution in the surface layer (treated article). "Spraying" in the present context means applying the solvent solution to the article in the form of droplets, fog or mist. The term flow-coating as used herein means applying the solvent solution to the article in the form of a continuous liquid film.

The solvent mixture in the immersion step contains the acid $H^+X^-$, water, a carrier, and an optional leveling agent. The water content of the solvent mixture is a positive amount up to 80 percent relative to its weight (pbw), preferably 60 to 75 pbw, more preferably 60 to 70 pbw. The carrier is present in the mixture at a positive amount of up to 30 pbw, preferably 15 to 25 pbw, the content of the optional leveling agent is up to 15 pbw, preferably 5 to 15 pbw. The molar concentration of $H^+X^-$ in the mixture is preferably 0.01 to 5.0 M, more preferably 0.1 to 0.5 M.

According to the present invention, the article is treated by applying the solvent mixture to at least a portion of its surface for a time and at temperature sufficient to facilitate at least some infusion of $H^+X^-$ into the article to obtain a treated surface layer by converting the polyamine to a polyamine hydrohalide, an ion-conducting polymer. For treating articles made of thermoplastic polyurethane, the temperature of the solvent mixture is preferably 25 to 95° C., more preferably in the range of 25 to 65° C. and the application time is preferably less than one hour, more preferably in the range of 0.1 to 20 minutes. Accelerated infusion of $H^+X^-$ may be attained by higher concentration, and/or temperature and/or time of contact of the solvent mixture with the surface of the article to be treated. In one embodiment, the preferred concentration of $H^+X^-$ in the bath is 0.2 M, but there is considerable latitude in this regard.

The carrier suitable in the context of the invention conforms structurally to $$R_1\text{-}[\text{---}O\text{---}(CH_2)_n]_m OR_2$$

where $R_1$ and $R_2$ independently denote a radical selected from linear and branched $C_{1-18}$ alkyl, benzyl, benzoyl, phenyl and H, n is 2 or 3, and m is 1-35, preferably 1-12, most preferably 1. Aromatic versions of $R_1$ and $R_2$ may, independently one from the other, be substituted in the aromatic ring by alkyl and or halogen. Most preferably $R_1$ denotes butyl and $R_2$ denotes H.

The optional leveling agent (in an amount of 0 to 15 pbw, preferably 5 to 15 pbw, most preferably 10 to 15 pbw) is an ionic and/or non ionic substance promoting even distribution of the precursor over the surface of the article. Suitable anionic leveling agents include amine salts or alkali salts of carboxylic, sulfamic or phosphoric acids, for example sodium lauryl sulfate, ammonium lauryl sulfate, lignosulfonic acid salts, ethylene diamine tetra acetic acid (EDTA) sodium salts and acid salts of amines such as laurylamine hydrochloride or poly(oxy-1,2-ethanediyl), alpha-sulfo-omega-hydroxy ether with phenol 1-(methylphenyl)ethyl derivative ammonium salts; or amphoteric, that is, compounds bearing both anionic and cationic groups, for example lauryl sulfobetaine; dihydroxy ethylalkyl betaine; amido betaine based on coconut acids; disodium N-lauryl amino propionate; or the sodium salts of dicarboxylic acid coconut derivatives. Suitable non-ionic leveling agents include ethoxylated or propoxylated alkyl or aryl phenolic compounds such as octylphenoxypolyethyleneoxyethanol or poly(oxy-1,2-ethanediyl),alpha-phenyl-omega-hydroxy, styrenated, polyols and diols. Suitable diols include the optionally halogen-substituted, linear or branched $C_{2-20}$ aliphatic dials, poly($C_{2-4}$ alkylene glycol), $C_{5-8}$-cycloaliphatic diols, monocyclic aromatic dials and aromatic dihydroxy compounds. A particularly preferred leveling agent is diethylene glycol.

Leveling agents, such as disclosed in "Lens Prep II", a commercial product of Brain Power International and LEVE-GAL DLP a product of Bayer MaterialScience LLC (a preformulated mixture) are also useful in the practice of the present invention.

In one embodiment of the inventive process, the acid solution is contained in one compartment and the article to be treated is positioned in another compartment of the same vessel or in a different vessel. The solution is pumped through suitable dispensers, such as atomizing nozzles or manifolds positioned in the vessel containing the article and inert gas, and is applied to the article in a manner calculated to expose a predetermined area of the article to the solution.

In a variation of this embodiment, the first compartment of the vessel is sized to contain a large article (e.g. sheet) and is equipped with a plurality of nozzles or dispensers positioned so as to enable contact between the solution and the article at a sufficient temperature and for a time calculated to infuse the reactive monomer solution to the article. These dispensers may be a series of atomizing nozzles creating a fine mist that covers the surface of the article to be treated, or alternatively, a manifold directing the flow of the reactive monomer mixture over the surface of the article. One advantage of this embodiment of the inventive process over immersion in the solution is the great reduction, often by a factor of 10, of the quantity of the solution needed to treat large articles. The limited quantity of solution needed makes it possible to also reduce the size of the ancillary equipment, such as pumps and heaters.

In addition, the use of nozzles, or alternatively a manifold, directs the heated monomer mixture directly onto the surface of the article. Hence, the ability to supply fresh solution to the surface of the article does not require strong agitation of the solution which is necessary to achieve uniformity of the treatment in the embodiment where immersion is the mode of applying the solution. Note, in the practice of this embodiment of the inventive process, the article to be treated is at no time immersed in the heated solvent mixture. Excess solution that may drip from the article is collected at the bottom of the first compartment containing the article being treated and is transferred back to the second compartment where the solution is brought back to the starting temperature and recycled. The recycling process is continued until the article is infused with the desired level of acid solution. This process may also be designed so that after the article has been treated, the equipment (e.g., atomizing nozzles) is used to deliver a high pressure liquid spray or gas jet to remove excess acid from the treated article's surface.

The polymeric material may include one or more additives known in the art for their function in the context of these materials. Such additives include, but are not limited to, mold release agents, fillers, reinforcing agents (in the form of fibers or flakes, most notably, metal flakes, such as, aluminum flakes and/or glass) flame retardant agents, light-diffusing agents pigments and opacifying agents, such as, titanium dioxide and the like, drip suppressants such as polytetrafluoroethylene, impact modifiers, UV-stabilizers, hydrolytic stabilizers and thermal stabilizers.

Articles may be molded by any methods including compression molding, injection molding, rotational molding, extrusion, injection and extrusion blow molding, fiber spinning, and casting; the method of molding is not critical to the practice of the inventive process. The articles may be any of large variety of items including such as are useful in the optical, electronics, automotive, entertainment, sporting goods, and medical sectors. Of particular emphasis are those applications wherein electrostatic dissipation properties are necessary or beneficial, such as in electronics or engine technology.

The molded articles may be any of a variety of useful items and include tubing for medical, automotive, or other applications, rubber sporting goods articles, computer keyboards, cellular phones, packaging and containers of all types, including ones for industrial components, residential and commercial lighting fixtures and components sheets used in building and construction, small appliances and their components, optical and sun-wear lenses, biosensors, aircraft components, floor and furniture coverings, explosive detectors as well as functional films including such films that are intended for use in film insert molding and electronics.

EXAMPLES

The present invention is further illustrated, but is not to be limited, by the following examples. All quantities given in "parts" and "percents" are understood to be by weight, unless otherwise indicated.

An exemplary set of experimental data was created using samples of TEXIN DP7-1199, a thermoplastic polyurethane elastomer produced by Bayer MaterialScience. Injection molded plaques (thickness 3.3 mm) were used as received from the supplier. The material was impregnated with an interpenetrating network of poly(2-diethylaminoethylmethacrylate). The polymer was soaked in a mixture of (99 pbw 2-diethylaminoethylmethacrylate and 1 pbw 2,2-dimethoxy-1,2-di(phenyl)ethanone) for 20 minutes at 22° C., then exposed to a 100 W, ultraviolet light source (365 nm peak wavelength) for five minutes under flowing nitrogen atmosphere. The process created a semi-interpenetrating network of poly(2-diethylaminoethylmethacrylate) in a shallow surface layer of the host polymer.

The overall mass fraction of the semi-interpenetrating network was 0.05. The material was immersed in a 0.2 M HCl solution in the infusion solvent (70% water, 20% butyl cellosolve, and 10% diethylene glycol, by volume) for 60 min at 65° C. Following the acid infusion, samples were air dried for at least 24 hours at 22° C. The surface resistivity of the treated material was determined to be about $10^9 \Omega/\square$, falling within the electrostatic dissipation range, whereas the surface resistivity of the unmodified DP7-1199 TPU was determined to be on the order of $10^{14} \Omega/\square$, falling within the electrically insulating range. Resistivity was measured with a Keithley 6517b high-resistance electrometer and 8009 resistivity test fixture.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A process comprising contacting at least a part of a surface of a polymeric article with a solvent mixture for a time and at a temperature sufficient to infuse at least a portion of the solvent mixture into the article, the solvent mixture containing;
    (a) water,
    (b) a carrier conforming to R1-[O—(CH2)n]mOR2 wherein R1 and R2 independently denote a radical selected from the group consisting of linear and branched C1-18 alkyl, benzyl, benzoyl, phenyl and H,
    wherein n is 2 or 3, and m is 1-35, and
    (c) an acid H+X—, wherein X— represents a halide anion selected from the group consisting of F—, Cl—, Br—, or I—,
    optionally,
    (d) a surface leveling agent,
    wherein the polymeric article comprises a host polymer and an immobilized amine functional species wherein a monomer of a pendant moiety of the amine functional species is capable of reacting with the acid H+X−, and wherein the resulting article has a treated surface layer containing a polyamine hydrohalide and a surface resistivity between about $1\times10^5\Omega/\square$ and about $1\times10^{12}\Omega/\square$.

2. The process according to claim 1, wherein the polymeric article contains at least one component selected from the group consisting of polyurethane, polyester, polyamide, polystyrene, polyetherimide, polymethylmethacrylate and acrylonitrile butadiene styrene.

3. The process according to claim 1, wherein the amine functional species is an amine-functional co-monomer.

4. The process according to claim 1, wherein the acid is a member selected from the group consisting of HF, HCl, HBr, or Hl.

5. The process according to claim 1, wherein the contacting is one selected from the group consisting of immersion, spraying and flow coating.

6. A process for producing an electrostatic discharge material comprising, contacting at least a part of a surface of a polymeric article with a solvent mixture for a time and at a temperature sufficient to infuse at least a portion of the solvent mixture into the article, the solvent mixture containing;

(a) water, (b) a carrier conforming to

wherein R1 and R2 independently denote a radical selected from the group consisting of linear and branched C1-18 alkyl, benzyl, benzoyl, phenyl and H, wherein n is 2 or 3, and m is 1-35, and (c) an acid H+X−, wherein X— represents a halide anion selected from the group consisting of F—, Cl—, Br—, or I—, optionally, (d) a surface leveling agent, wherein the polymeric article comprises a host polymer and an immobilized amine functional species wherein a monomer of a pendant moiety of the amine functional species is capable of reacting with the acid H+X−, and wherein the resulting electrostatic discharge material has a treated surface layer containing a polyamine hydrohalide and a surface resistivity between about $1\times10^5\Omega/\square$ and about $1\times10^{12}\Omega/\square$.

7. The process according to claim 6, wherein the polymeric article contains at least one component selected from the group consisting of polyurethane, polyester, polyamide, polystyrene, polyetherimide, polymethylmethacrylate and acrylonitrile butadiene styrene.

8. The process according to claim 6, wherein the amine functional species is an amine-functional co-monomer.

9. The process according to claim 6, wherein the acid is a member selected from the group consisting of HF, HCl, HBr, or Hl.

10. The process according to claim 6, wherein the contacting is one selected from the group consisting of immersion, spraying and flow coating.

\* \* \* \* \*